(12) United States Patent
Allen

(10) Patent No.: US 11,313,731 B2
(45) Date of Patent: *Apr. 26, 2022

(54) SYSTEM AND METHOD FOR MONITORING A TEMPERATURE-RELATED CONDITION

(71) Applicant: Weber-Stephen Products LLC, Palatine, IL (US)

(72) Inventor: Christopher J. Allen, West Hartford, CT (US)

(73) Assignee: WEBER-STEPHEN PRODUCTS LLC, Palatine, IL (US)

( * ) Notice: Subject to any disclaimer, the term of this patent is extended or adjusted under 35 U.S.C. 154(b) by 95 days.

This patent is subject to a terminal disclaimer.

(21) Appl. No.: 16/933,217

(22) Filed: Jul. 20, 2020

(65) Prior Publication Data

US 2020/0348184 A1 Nov. 5, 2020

Related U.S. Application Data

(63) Continuation of application No. 16/288,500, filed on Feb. 28, 2019, now Pat. No. 10,718,671, which is a
(Continued)

(51) Int. Cl.
*G01K 1/02* (2021.01)
*G01K 1/024* (2021.01)
(Continued)

(52) U.S. Cl.
CPC ............. *G01K 1/024* (2013.01); *G01K 1/028* (2013.01); *G01K 1/14* (2013.01); *G01K 1/143* (2013.01);
(Continued)

(58) Field of Classification Search
CPC .......... G01K 1/02; G01K 1/024; G01K 1/028; G01K 1/14; G01K 1/143; G01K 13/00; G01K 2207/06
See application file for complete search history.

(56) References Cited

U.S. PATENT DOCUMENTS 5,746,114 A 5/1998 Harris
6,046,674 A 4/2000 Irwin et al.
(Continued)

OTHER PUBLICATIONS

Brookstone, "Grill Alert™ Talking Remote Meat Thermometer Instructions," dated Mar. 18, 2005, 6 pages.
(Continued)

*Primary Examiner* — Tung S Lau
(74) *Attorney, Agent, or Firm* — Hanley, Flight & Zimmerman LLC

(57) ABSTRACT

Systems and methods for monitoring and/or controlling a temperature related condition of an item, including from a location different than a location at which the food item is located, are disclosed. At least one remote unit has a temperature sensor, a computing device configured to analyze measured temperature data, and a user interface. The user interface displays information regarding a temperature related condition of the item via light or visual signals. A control unit may wirelessly communicate with the remote unit. The control unit may be used to program the user interface to display particular light or visual signals in response to particular temperature related conditions. The control unit may instruct a temperature control mechanism to adjust the temperature of the item.

18 Claims, 9 Drawing Sheets

Related U.S. Application Data continuation of application No. 14/932,950, filed on Nov. 4, 2015, now Pat. No. 10,254,171.

(60) Provisional application No. 62/075,217, filed on Nov. 4, 2014, provisional application No. 62/075,219, filed on Nov. 4, 2014.

(51) Int. Cl.
*G01K 13/00* (2021.01)
*G01K 1/14* (2021.01)
*G01K 1/143* (2021.01)

(52) U.S. Cl.
CPC ......... *G01K 13/00* (2013.01); *G01K 2207/06* (2013.01)

(56) References Cited

U.S. PATENT DOCUMENTS

| | | | |
|---|---|---|---|
| 6,080,972 A | 6/2000 | May | |
| 6,539,842 B1 | 4/2003 | Chapman et al. | |
| D487,022 S | 2/2004 | Mayer et al. | |
| 6,712,505 B2 | 3/2004 | Chapman et al. | |
| 6,811,308 B2 | 11/2004 | Chapman et al. | |
| 6,850,861 B1 | 2/2005 | Faiola et al. | |
| 7,128,466 B2 | 10/2006 | Chang et al. | |
| D531,529 S | 11/2006 | Sato et al. | |
| 7,201,099 B2 | 4/2007 | Harris, Jr. et al. | |
| D557,622 S | 12/2007 | Thompson | |
| 7,372,368 B2 | 5/2008 | Chapman et al. | |
| D571,232 S | 6/2008 | Lawler et al. | |
| D573,904 S | 7/2008 | Lawler et al. | |
| D582,299 S | 12/2008 | Claypool | |
| D584,970 S | 1/2009 | Eide et al. | |
| D586,671 S | 2/2009 | Eide et al. | |
| 7,703,389 B2 | 4/2010 | McLemore et al. | |
| 8,582,034 B2 * | 11/2013 | Kwong | H04N 9/73 348/603 |
| 8,669,716 B2 * | 3/2014 | Recker | H05B 47/19 315/291 |
| 8,931,400 B1 | 1/2015 | Allen | |
| D730,204 S | 5/2015 | Juhng et al. | |
| D730,205 S | 5/2015 | Juhng et al. | |
| 9,414,651 B2 * | 8/2016 | Proud | A61B 5/0022 |
| 9,530,089 B2 * | 12/2016 | Proud | G06K 19/07762 |
| 10,254,171 B1 * | 4/2019 | Allen | G01K 1/14 |
| 10,339,783 B2 | 7/2019 | Allen, Sr. | |
| 10,388,141 B2 | 8/2019 | Allen, Sr. | |
| 10,718,671 B2 | 7/2020 | Allen | |
| 11,206,473 B2 * | 12/2021 | Ji | A45C 13/1069 |
| 2003/0202558 A1 | 10/2003 | Chung et al. | |
| 2005/0261991 A1 | 11/2005 | Kennamer | |
| 2006/0191919 A1 | 8/2006 | Cheu | |
| 2009/0195524 A1 * | 8/2009 | Shen | G09G 5/00 345/207 |
| 2010/0303972 A1 | 12/2010 | Srivastava | |
| 2014/0246502 A1 * | 9/2014 | Proud | G08C 17/02 235/492 |
| 2015/0257243 A1 * | 9/2015 | Saffari | H05B 45/18 315/113 |
| 2016/0120001 A1 * | 4/2016 | Clark | H05B 47/18 315/153 |
| 2016/0220059 A1 | 8/2016 | Wachtler et al. | |
| 2017/0094756 A1 * | 3/2017 | Saffari | A01K 63/06 |
| 2018/0195989 A1 * | 7/2018 | Scaboo | C12M 27/02 |

OTHER PUBLICATIONS

Weber Style™ Tools, 'Weber Style™ Digital Thermometer, (available prior to May 28, 2009), retrieved May 28, 2010 from [http://store.weber.com/WeberStyle/Detail.aspx?pid=1131], 1 page.

United States Patent and Trademark Office, "Non-Final Office Action," issued in connection with U.S. Appl. No. 14/932,950, dated Sep. 25, 2017, 20 pages.

United States Patent and Trademark Office, "Final Office Action," issued in connection with U.S. Appl. No. 14/932,950, dated Feb. 9, 2018, 15 pages.

United States Patent and Trademark Office, "Advisory Action," issued in connection with U.S. Appl. No. 14/932,950, dated Apr. 18, 2018, 2 pages.

United States Patent and Trademark Office, "Non-Final Office Action," issued in connection with U.S. Appl. No. 14/932,950, dated Jul. 3, 2018, 17 pages.

United States Patent and Trademark Office, "Notice of Allowance and Fee(s) Due," issued in connection with U.S. Appl. No. 14/932,950, dated Nov. 28, 2018, 7 pages.

United States Patent and Trademark Office, "Non-Final Office Action," issued in connection with U.S. Appl. No. 16/288,500, dated Oct. 22, 2019, 16 pages.

United States Patent and Trademark Office, "Notice of Allowance and Fee(s) Due," issued in connection with U.S. Appl. No. 16/288,500, dated Feb. 25, 2021, 9 pages.

* cited by examiner

SYSTEM AND METHOD FOR MONITORING A TEMPERATURE-RELATED CONDITION

CROSS-REFERENCE TO RELATED APPLICATIONS

This patent application is a continuation of U.S. patent application Ser. No. 16/288,500, filed on Feb. 28, 2019, issued as U.S. Pat. No. 10,718,671 B2 on Jul. 21, 2020, which is a continuation of U.S. patent application Ser. No. 14/932,950, filed on Nov. 4, 2015, issued as 10,254,171 B1 on Apr. 9, 2019, which in turn claims the benefit under 35 U.S.C. § 119(e) of U.S. Provisional Patent Application No. 62/075,219, filed on Nov. 4, 2014, and U.S. Provisional Patent Application No. 62/075,217, filed on Nov. 4, 2014. All of these disclosures are hereby expressly incorporated by reference as part of the present disclosure as if fully set forth herein.

FIELD OF THE INVENTION

The present invention relates to temperature monitoring systems and methods, such as for monitoring or measuring food temperatures.

BACKGROUND

For a food item, the temperature of the food item is of importance in obtaining a desired result. In the heating of a food item, for example, the temperature of the food item often plays a determinative role in the extent to which the food item is cooked. In the cooling of a food item, as another example, the temperature of the food item often plays a determinative role in the extent to which the food item is preserved for future consumption.

The temperature of a food item can also be relevant to the desired taste of the food item. The temperatures necessary to achieve a desired taste of a food item are generally known. The temperature of a food item can also be relevant to the safety of a food item. To this end, for example, the U.S. Department of Agriculture (USDA) has issued guidelines establishing temperatures at which it considers a food item to be adequately cooked to sufficiently destroy microbial or other biological contaminants in the food item so as to make the food item generally safe to eat.

For these and other purposes, food thermometers have been used to measure the temperature of a food item. A drawback of some known food thermometers is that one can be required to be physically present at the location of the food item being heated or cooled in order to view the temperature displayed by the food thermometer. This can inconveniently prevent the user from attending to other activities, and can require the user to return to the heating or cooling location to monitor the progress of the heating or cooling. If the food is being heated and the user does not return in time, the food item can become overheated (i.e., overcooked). If the food is being cooled and the user does not return in time, the food item can become undesirably cold.

Typical food thermometers display the current temperature of the food. A user is thus required to read the display, recall the desired temperature of the food, and thereby evaluate whether the food is sufficiently cooked (or cooled), or how close the food is to being sufficiently cooked (or cooled). This limited delivery of information can cause delay or inefficiency, especially if the user is engaged in multiple tasks simultaneously.

Devices that remotely monitor the temperature of a food item being heated or cooled are known; however, such devices can have one or more drawbacks. First, such devices can require specialized equipment, including a first unit located where the food item is being heated or cooled, and a second unit located remotely from where the food item is being heated or cooled. Such use of two specialized units can cause such devices to be relatively expensive. Further, such devices can have limited flexibility in use and limited programmability. One temperature monitoring device and method is disclosed in U.S. Pat. No. 8,931,400, whose teachings are hereby incorporated by reference in their entirety.

SUMMARY OF THE INVENTION

The inventor has determined that it would be beneficial to a user to deliver information regarding temperature-related conditions of the food, such as whether the food has reached the desired temperature, how close the food is to the desired temperature, and/or whether further time is required to reach the desired temperature.

A temperature monitoring system is configured to deliver information to a user regarding one or more temperature-related conditions of an object or item. The system comprises one or more remote units, each configured to measure the temperature of an object. The remote units may comprise a temperature sensor and one or more user interfaces. The system further comprises a computing device configured to analyze temperature data measured by the temperature sensor and thereby determine a temperature related condition of the object. In some embodiments, the computing device is contained within the remote unit.

In some embodiments, the object being monitored is a food item that is being cooked or cooled. In such embodiments, the system is configured to deliver information regarding a temperature-related condition associated with the cooking or cooling process. These can include whether the food has reached a desired temperature, whether the temperature of the food has deviated more than a particular range from a desired temperature, or the degree to which the food has finished cooking or cooling.

In some embodiments, the system further comprises a control unit. In such embodiments, the remote unit is configured to communicate wirelessly with the control unit. In some such embodiments, the control unit contains a computing device configured to analyze temperature data measured by the temperature sensor and thereby determine a temperature related condition of the object. Furthermore, in some such embodiments, the control unit may be configured to deliver instructions to the remote unit. The instructions can include particular information to deliver to a user upon the occurrence of certain temperature related conditions. In some embodiments, the control unit is operatively connected to a thermostat and is configured to transmit instructions to the thermostat regarding adjusting the heat or cooling delivered to the food item.

In some embodiments, the information regarding a temperature-related condition is delivered to a user by transmitting light or visual signals to the user. In some such embodiments, the light or visual signals may be transmitted from a user interface of the remote unit, from a user interface of the control unit, or both. In some such embodiments, the light signals comprise colored lights, blinking lights, or both. The remote unit and/or control unit may be programmable by a user to display particular light or visual signals corresponding to particular temperature-related conditions.

In some embodiments, the system includes first means for measuring the temperature of an item, second means for analyzing the measured temperature and for subsequently determining a temperature related condition of the food item, and third means for displaying a plurality of colored lights or visual signals, wherein each of said plurality corresponds to a different relation of the current temperature related condition to the pre-set or desired temperature related condition. In some such embodiments, the first means is a remote unit comprising a temperature sensor configured to measure the temperature of the object, the second means is a computing device configured to analyze temperature data measured by the temperature sensor and thereby determine a current temperature related condition and a relation of the current temperature related condition to a pre-set or desired temperature related condition of the object, and the third means is a user interface configured to display a plurality of colored light or visual signals, wherein each of said plurality corresponds to a different relation of the current temperature related condition to the pre-set or desired temperature related condition.

Some embodiments further include a fourth means for delivering instructions to the third means, the instructions comprising one or more of (i) the pre-set or desired temperature related condition or (ii) which of said plurality of colored light or visual signals are to be displayed for a relation of the current temperature related condition to said pre-set or desired temperature related condition. In some such embodiments, the fourth means is a control unit remote from the first means or remote unit and configured to deliver said instructions to first means or remote unit. Yet further embodiments include fifth means for adjusting heat or cooling delivered to the item based on the current temperature-related condition. In some such embodiments, the sixth means is a thermostat configured to control the temperature of the object.

Methods for monitoring one or more temperature-related conditions of an item include measuring a temperature of the item and displaying temperature information about the item. In some embodiments, the method comprises measuring the temperature of a food item with a temperature sensor; analyzing the measured temperature data and thereby determining information about a temperature-related condition of the food item; and transmitting information to a user about the temperature related condition. In some embodiments, the information is transmitted in the form of light or visual signals. In some embodiments, the light signals comprise a series of colored lights, blinking lights, or both. In some embodiments, the light or visual signals are transmitted from a user interface of either the remote unit, the control unit, or both.

In some embodiments, the method includes programming the remote unit and/or control unit to display particular light or visual signals corresponding to particular temperature-related conditions. In some embodiments, the method further comprises programming a thermostat to adjust the heat or cooling delivered to the food item in response to the received temperature data.

Other objects and advantages of the present invention will become apparent in view of the following detailed description of the embodiments and the accompanying drawings.

DETAILED DESCRIPTION OF EMBODIMENTS OF THE INVENTION

Figure 1:
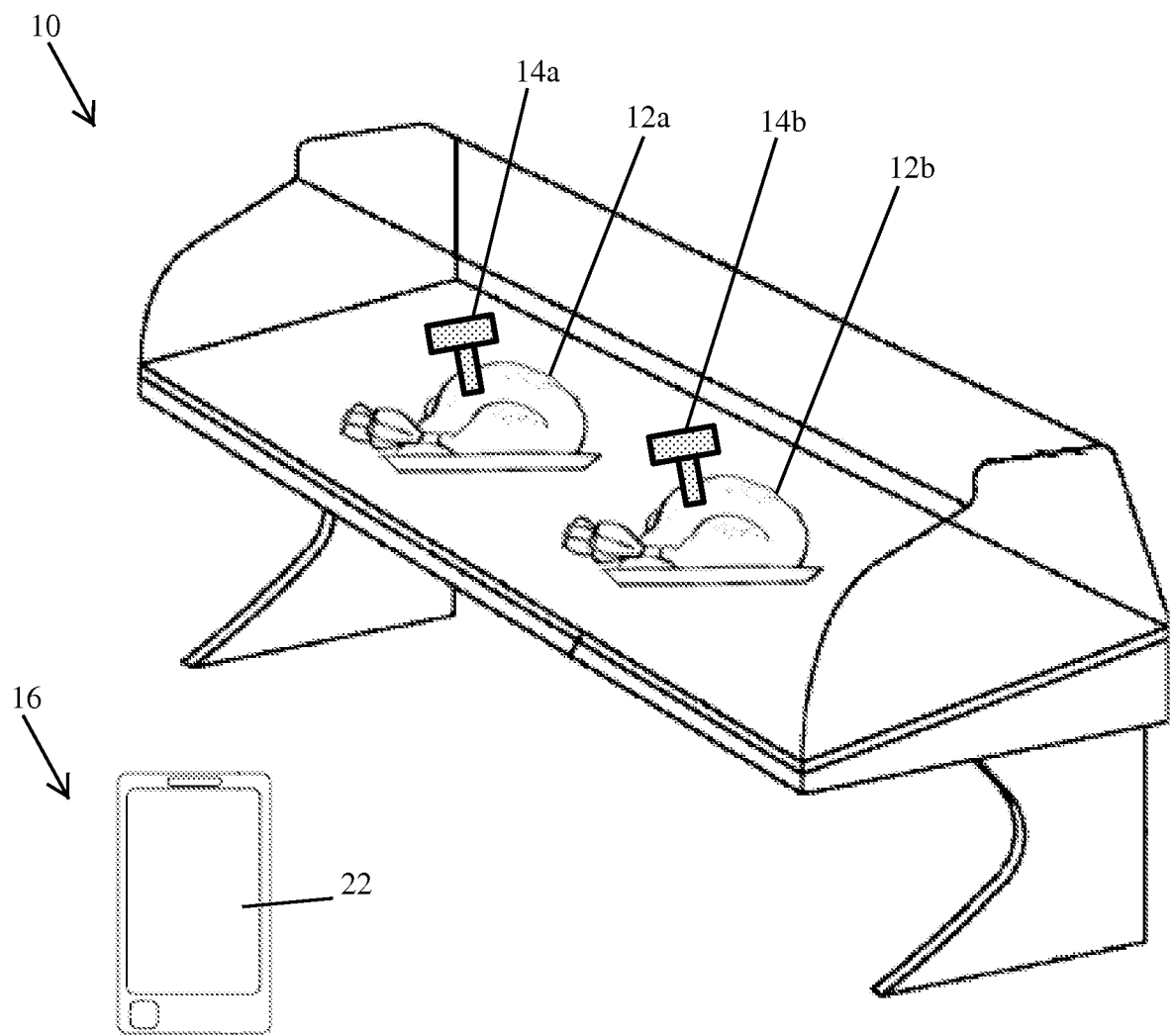
FIG. 1 illustrates a schematic perspective view of a temperature monitoring system that has two remote units and a control unit.

Systems 10 (see FIGS. 1 and 5) are configured for monitoring one or more temperature-related conditions of one or more items. In the below described embodiments, each system 10 is being used in the context of monitoring one or more temperature-related conditions of one or more food items 12 (see FIGS. 1 and 5). However, the systems 10 and the invention can additionally or alternatively be used for monitoring one or more temperature-related conditions of one or more other items, which may be of any nature, and not limited to food or like items.

Further, though the following description is made with reference to the exemplary embodiments illustrated in the drawings; the invention is not limited to the exemplary embodiments illustrated in the drawings. The present disclosure may describe one or more features as having a length extending relative to an x-axis, a width extending relative to a y-axis, and/or a height extending relative to a z-axis. The drawings illustrate the respective axes as necessary. There is no required relationship between the axes and the direction of gravity.

The present disclosure uses the terms "food item," "temperature-related condition," "heating device," "cooling device," and variations thereof. The term "food item," and variations thereof, is used herein to indicate any item that may be ingested (e.g., foods, drinks, medicines, etc.). The term "temperature-related condition," and variations thereof, are used herein to indicate a temperature, or to indicate a condition based at least partially on a temperature (e.g., an extent to which a food item has been heated or cooled). The term "heating device" is used herein to indicate any device or mechanism (e.g., a barbeque, an open fire, a campfire, an indoor oven, an outdoor oven, a microwave) that is operable to increase a temperature of a food item relative to an ambient temperature of a surrounding environment. The term "cooling device" is used herein to indicate any device or mechanism (e.g., a refrigerator, an ice bath, a pile of snow) that is operable to decrease a temperature of a food item relative to an ambient temperature of a surrounding environment.

Figure 5:
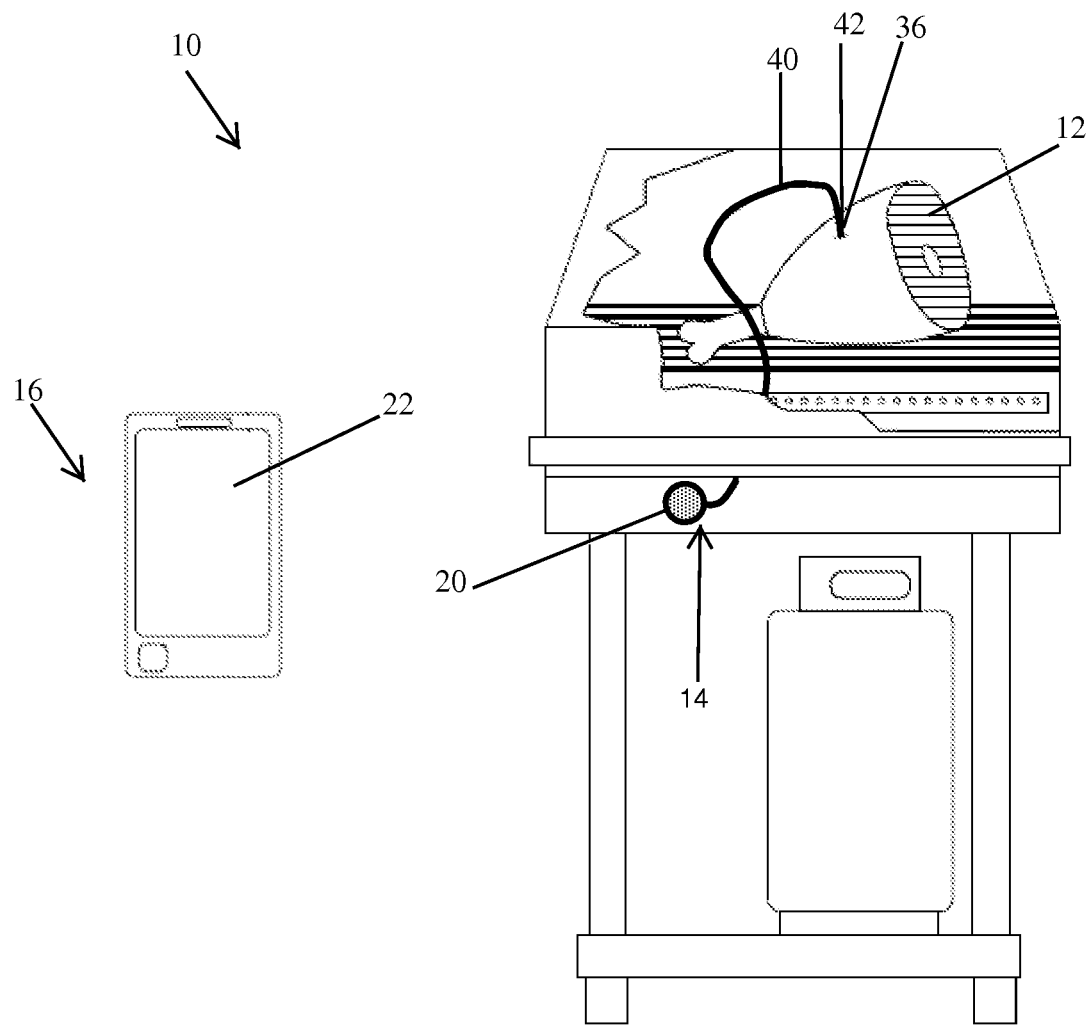
FIG. 5 illustrates a schematic view of another temperature monitoring system that has one remote unit and a control unit.

Referring to FIGS. 1 and 5, a system 10 includes one or more remote units 14 and one or more control units 16. The remote units 14 and the control units 16 are discrete components that are remotely located relative to one another.

The number of remote units 14 and control units 16 included in the system 10 can vary depending, for exampling, on the number of food items 12 to be monitored, and/or the number of users that will be using the system 10. Referring FIG. 1, in the first illustrated embodiment, the system 10 includes a first remote unit 14a disposed relative to a first food item 12a, a second remote unit 14b disposed relative to a second food item 12b, and a control unit 16 remotely located relative to the first remote unit 14a and the second remote unit 14b. Referring to FIG. 5, in another embodiment, the system 10 includes a remote unit 14 disposed relative to a food item 12, and a control unit 16 remotely located relative to the first remote unit 14. In other embodiments not illustrated in the drawings, the system 10 can include more than two remote units 14, and/or more than one control unit 16.

Referring also to FIGS. 2-4 and 6-9, the one or more remote units 14 each include a remote unit temperature sensor 18, a remote unit computing device (not shown as in the depicted embodiment it is internal to the remote units 14), and a remote unit user interface 20. The remote unit temperature sensor 18 is operable to generate a temperature signal indicative of a temperature of a food item 12 (see FIGS. 1 and 5), and is operable to send the temperature signal to the remote unit computing device, in a manner that would be understood by those of ordinary skill in the art. The remote unit computing device is operable to receive the temperature signal from the remote unit temperature sensor 18, and is operable to determine a temperature-related condition of the food item 12 using the temperature signal. The remote unit computing device is operable to selectively cause the remote unit user interface 20 (and, in some embodiments, the control unit user interface 22) to convey the determined temperature-related condition of the food item 12 to a user by transmitting light or visual signals to the user. When perceived by the user, the light or visual signals in some embodiments have a color that may be previously known by the user, or that may be intuitively understandable by the user, but regardless, correspond to the determined temperature-related condition of the food item 12.

Referring again to FIGS. 1 and 5, the one or more control units 16 each include a control unit user interface 22 and a control unit computing device (not shown). The control unit user interface 22 is operable to permit a user to input user data regarding the food item 12, and/or user data regarding a desired temperature-related condition of the food item 12. The control unit computing device is operable to receive the user data, and is operable to send (e.g., via wireless connection) the user data to the remote unit computing device. The remote unit computing device is operable to receive the user data, and is operable to use the user data in determining the temperature-related condition of the food item 12. Additionally or alternatively, the user data can influence the time and/or manner in which the remote unit computing device selectively causes the remote unit user interface 20 to convey the determined temperature-related condition of the food item 12 to the user.

The one or more remote units 14, and or the one or more control units 16, can each include one or more additional components operable to achieve the functionality described herein, as would be understood by those of ordinary skill in the art.

The remote unit 14, the control unit 16, and the one or more components thereof, can be configured in various different ways.

Referring again to FIGS. 2-4 and 6-9, the one or more remote units 14 each include a remote unit body 24 to which is attached or attachable the remote unit temperature sensor 18, and includes the remote unit computing device (not shown), and/or the remote unit user interface 20. The remote unit body 24 of each remote unit 14 defines an annularly-extending side surface 26, an at least substantially flat top surface 28, and in the case of the embodiment of FIGS. 6-9, an at least substantially flat bottom surface 30. The side surface 26 of the remote unit body 24 extends in a heightwise direction between the top and bottom surfaces 28, 30 of the remote unit body 24. The remote unit body 24 can be formed of various different materials or combinations of materials (e.g., plastics, composites, metals, heat-resistant materials, cold-resistant materials, etc.). The one or more materials of the remote unit body 24 can be selected, for example, based on how the system 10 is intended to be used for monitoring a temperature-related condition of then item 12, e.g., positioned within a heating device or a cooling device.

Figure 6:
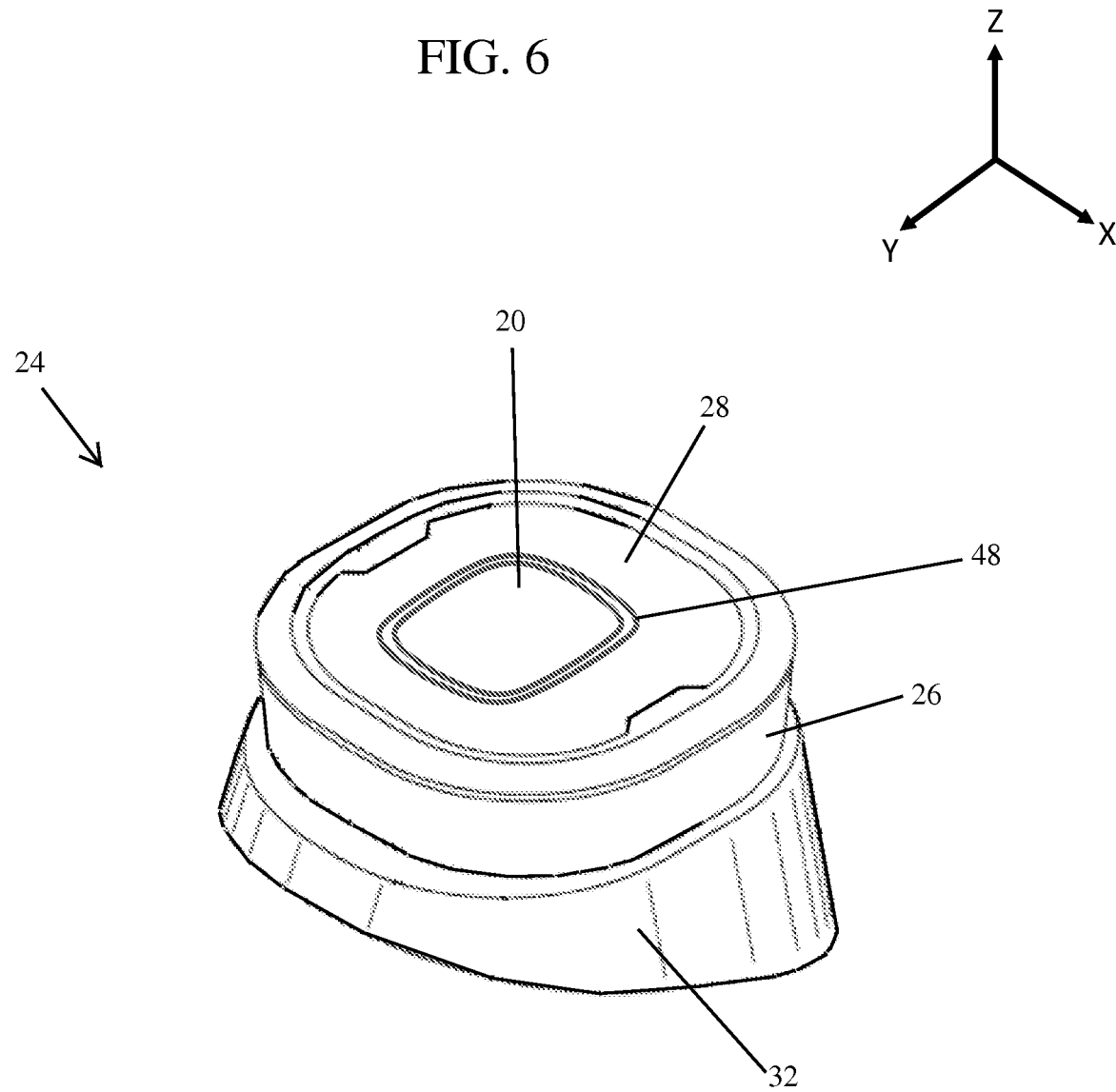
FIG. 6 illustrates a top perspective view of a portion of a temperature measuring unit.
Figure 7:
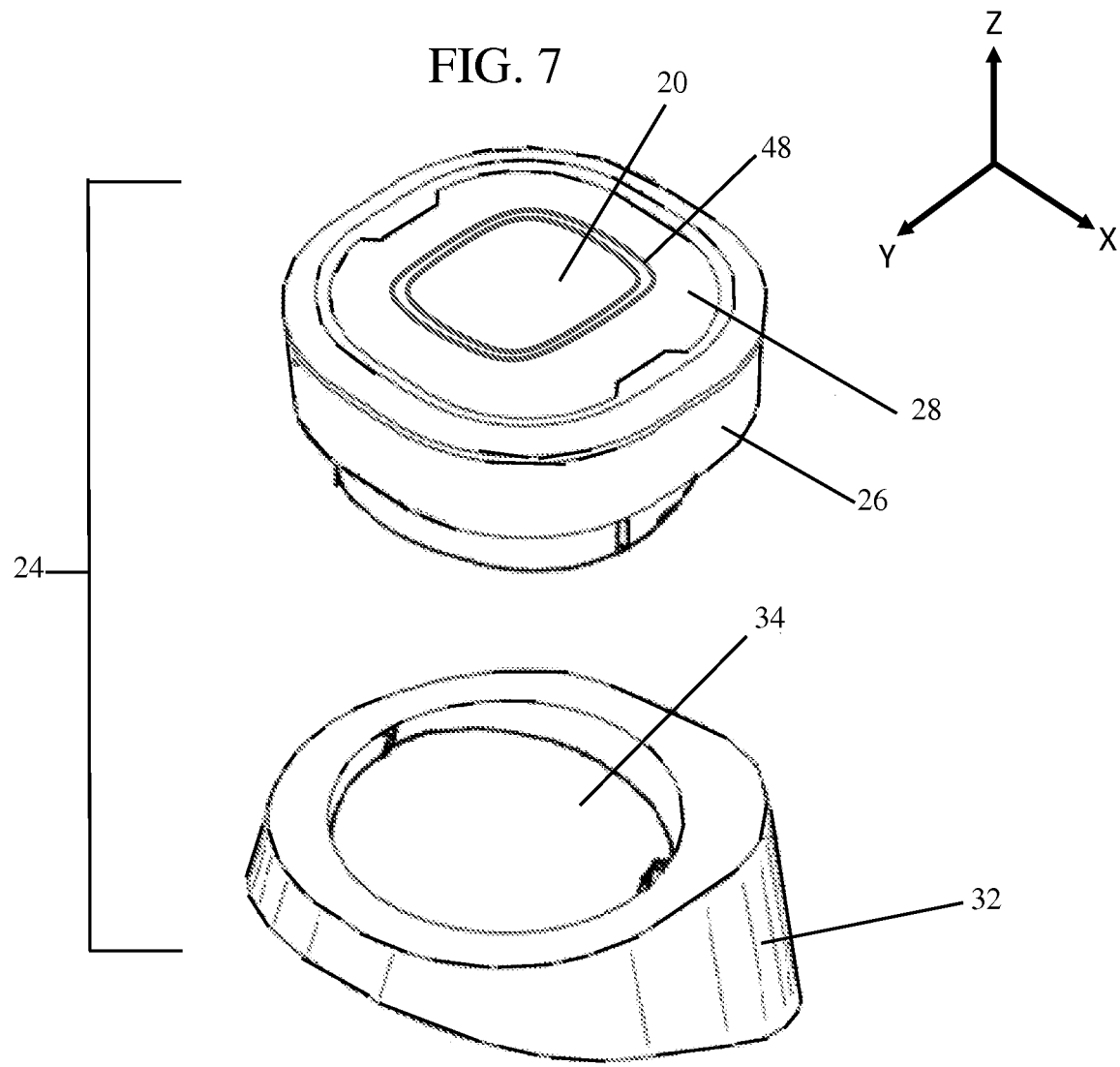
FIG. 7 illustrates an exploded perspective view of the portion of the unit shown in FIG. 6.
Figure 9:
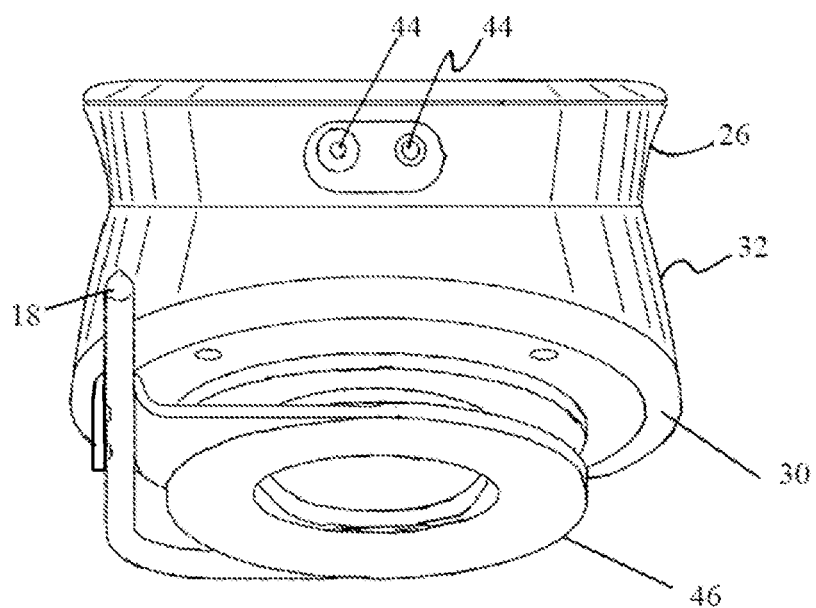
FIG. 9 illustrates an elevation view of the remote unit shown in FIG. 6 with the probe support shown in FIG. 8 attached thereto.

Referring further to FIGS. 6, 7, and 9, in some embodiments, the remote unit 14 additionally includes a remote unit base 32. In such embodiments, the remote unit body 24 is operable to be removably connected to the remote unit base 32. In the illustrated embodiment, for example, the remote unit base 32 defines a recess 34 within which the remote unit body 24 is partially received. When received within the recess of the remote unit base 32, the bottom surface 30 and the side surface 26 of the remote unit body 24 abut corresponding surfaces of the remote unit base 32 that at least partially define the recess 34.

The remote unit body 24 and/or the remote unit base 32 can additionally or alternatively include one or more of the features described in the related U.S. provisional patent application No. 62/075,217 entitled "Remote Cooking Systems and Methods" filed on Nov. 4, 2014, and the U.S. patent application entitled "Temperature Monitoring Systems and Methods" filed on herewith date which are hereby incorporated by reference in their entirety. For example, the removable connection between the remote unit body 24 and the remote unit base 32 can be by magnetic connection, snap fit connection, friction fit connection, a twist-lock connection, threaded connection, and/or other means for removable connection. Also, the remote unit base 32 can include a magnetic portion that is operable to permit removable connection of the remote unit base 32 (and thus the remote unit body 24) to a heating device (see, e.g., FIG. 5 of the present disclosure), a cooling device, or another structure. Further, the remote unit body 24 and the remote unit base 32 can be configured such that the remote unit body 24 can be selectively positioned in one of several different orientations relative to remote unit base 32, with each of the orientations providing a user with a different view angle of the remote unit user interface 20 when the remote unit base 32 and thus the remote unit body 24 are removably connected to a heating device, a cooling device, or another structure.

Figure 2:
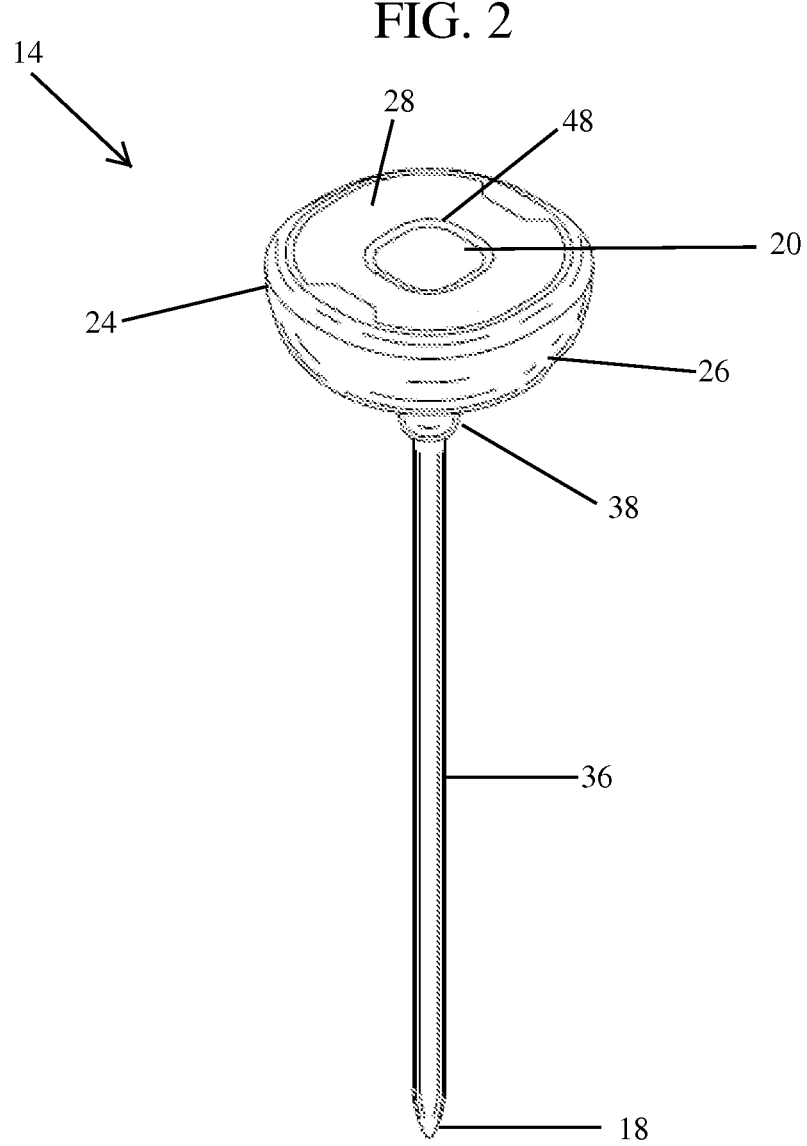
FIG. 2 illustrates a top perspective view of a temperature measuring unit.
Figure 3:
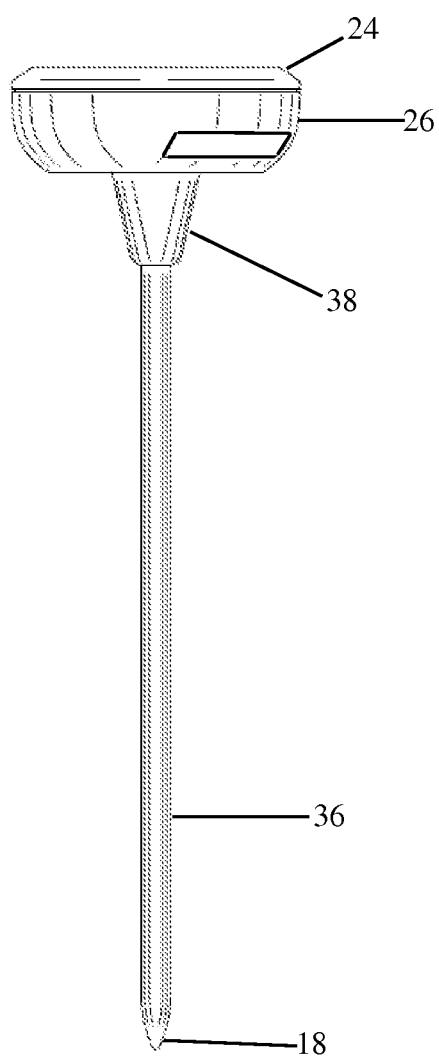
FIG. 3 illustrates a side elevation view of the unit shown in FIG. 2.
Figure 4:
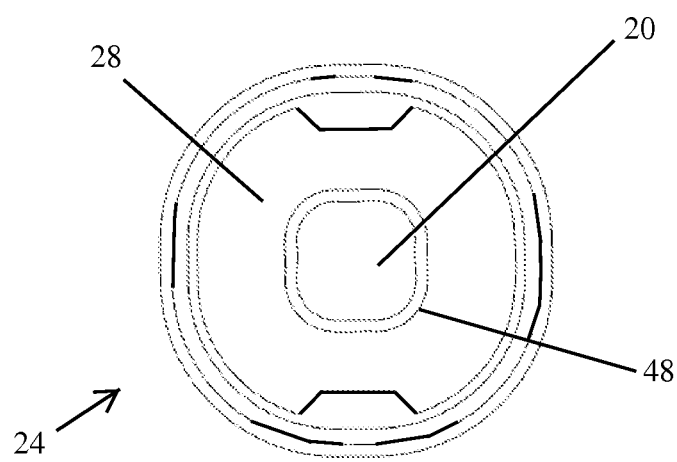
FIG. 4 illustrates a top plan view of the unit shown in FIG. 2.
Figure 8:
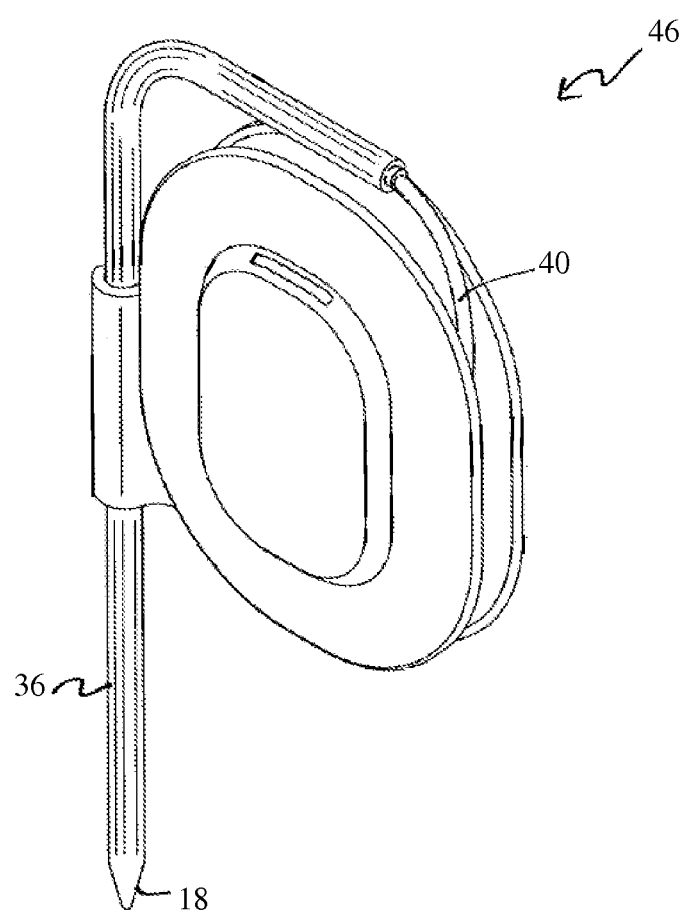
FIG. 8 illustrates a top perspective view of a probe support.

The remote unit temperature sensor 18 can be a thermistor-type temperature sensor, a thermocouple-type sensor, or another type of temperature sensor that is known or may become known. Referring to FIGS. 2, 3, 5, 8, and 9, the remote unit temperature sensor 18 includes a thermal probe 36 that is operable to be disposed relative to the food item 12. Referring to FIGS. 2 and 3, in that embodiment, the thermal probe 36 is integrally connected to the remote unit body 24, and extends in a heightwise direction through a neck portion 38 that extends from the bottom surface 30 of the remote unit body 24. Referring to FIGS. 5, 8, and 9, in that embodiment, the thermal probe 36 is not integrally connected to the remote unit body 24; instead, as seen in FIGS. 8 and 9, the remote unit temperature sensor 18 includes a probe wire 40, the thermal probe 36 is integrally connected to a first end 42 of the probe wire 40, and the opposing second end (not shown) of the probe wire 40 is selectively connectible to the remote unit body 24 via a port 44 disposed relative to the side surface 26 of the remote unit body 24.

The remote unit temperature sensor 18 can additionally or alternatively include one or more of the features described in U.S. patent application Ser. No. 12/790,764, filed May 28, 2010, and 61/213,306, filed May 28, 2009, now U.S. Pat. No. 8,931,400, which are hereby incorporated by reference in their entirety. For example, in some embodiments in which the thermal probe 36 of the remote unit temperature sensor 18 is not integrally connected to the remote unit body 24, the remote unit 14 can additionally include a probe support 46 that is the same as, or similar to, the probe support disclosed in the above-referenced patent applications. Referring to FIGS. 8 and 9, in the second illustrated embodiment of the present disclosure, the remote unit 14 includes a probe support 46 that allows the probe wire 40 and the thermal probe 36 to be removably retained thereon.

As discussed above, the remote unit computing device is operable to: (i) receive a temperature signal indicative of a temperature of a food item 12 (see FIGS. 1 and 5) from the remote unit temperature sensor 18; (ii) determine a temperature-related condition of the food item 12 using the temperature signal; (iii) selectively cause the remote unit user interface 20 to convey the determined temperature-related condition of the food item 12 to a user; and (iv) receive user data from the control unit computing device, and use the user data in determining the temperature-related condition of the food item. In some embodiments, the remote unit computing device is additionally or alternatively operable to (v) selectively cause the control unit user interface 22 to convey the determined temperature-related condition of the food item 12 to a user. In some embodiments, the remote unit computing device is additionally or alternatively operable to perform one or more of the functions described herein below.

The functionality of the remote unit computing device can be implemented in various different ways, using hardware, software, firmware, and/or a combination thereof. The hardware of the remote unit computing device can include, for example, a processor (e.g., a programmable microprocessor), a memory storage device (e.g., a non-transitory memory storage device), an input-output device (e.g., a Bluetooth Low Energy radio, a Bluetooth radio, a Wi-Fi radio, an antenna, a USB port, an Ethernet port), and/or a power supply (e.g., a battery). The remote unit computing device can communicate with other components of the system 10 via wired and/or wireless connections. In the illustrated embodiments, for example, the remote unit computing device communicates with other components of the remote unit 14 (e.g., the remote unit temperature sensor 18, the remote unit user interface 20) via wired connections, and communicates with components of the control unit 16 (e.g., the control unit computing device) via wireless connections. The remote unit computing device can be IP addressable in order to allow authorized devices (e.g., the control unit 16) to communicate with the remote unit computing device via internet connection. The remote unit computing device can additionally or alternatively include one or more of the features of the remote unit described in the above-referenced patent applications.

As discussed above, the control unit computing device is operable to: (i) receive the user data; and (ii) use the user data in determining the temperature-related condition of the food item 12. In some embodiments, the control unit computing device is additionally operable to perform one or more of the functions described herein below.

The functionality of the control unit computing device can be implemented in various different ways, using hardware, software, firmware, and/or a combination thereof. The hardware of the control unit computing device can include, for example, a processor (e.g., a programmable microprocessor), a memory storage device (e.g., a non-transitory memory storage device), an input-output device (e.g., a Bluetooth Low Energy radio, a Bluetooth radio, a Wi-Fi radio, an antenna, a USB port, an Ethernet port), and/or a power supply (e.g., a battery). The control unit computing device can communicate with other components of the system 10 via wired and/or wireless connections. The control unit computing device can be IP addressable in order to allow authorized devices (e.g., the remote unit 14) to communicate with the control unit computing device via internet connection. The control unit computing device can additionally or alternatively include one or more of the features of the control unit described in the above-referenced patent applications.

In some embodiments, the remote unit user interface 20 is selectively operable to convey the determined temperature-related condition of the food item 12 to a user by transmitting light or visual signals to the user. In some embodiments, the signals are one or more colors. In some such embodiments, the one or more colors correspond to the determined temperature-related condition of the food item 12. In some embodiments, the remote unit user interface 20 includes one or more light sources (e.g., LEDs, laser diodes, lamps, bulbs) that are selectively operable to transmit the above-described light signals. The light sources can be included in an LED array, an LCD display, a plasma display, or another type of display. The one or more wavelengths of the light signals transmitted by the remote unit user interface 20 can be selectively adjusted in order to selectively control the perceived color of the light signals. The number of possible perceived colors depends on the wavelengths at which the remote unit user interface 20 is operable to transmit the light signals. In some embodiments, the wavelengths can include all wavelengths within the visible light spectrum. In other embodiments, the wavelengths can include wavelengths within only one or more ranges within the visible light spectrum (e.g., a range corresponding to red perceived light, a range corresponding to blue perceived light, etc.).

In some embodiments, the remote unit user interface 20 is configured to display multiple colors to indicate different states of the remote unit 14 and/or the temperature-related condition of the food item 12. For example, the remote unit user interface 20 can contain a multi-color LED array 48 (see FIGS. 2, 4, 6, and 7). In some embodiments, the remote unit user interface 20 can display one or more of the colors it is capable of displaying based on programming in the remote unit 14, and/or programming in the control unit 16 that is transmitted to the remote unit 14. In some embodiments, the remote unit 14 can contain a program for displaying one or more colors, and such program can be modified by a program transmitted to the remote unit 14 from the control unit 16.

In some embodiments, the color(s) displayed by the remote unit user interface 20 can indicate a status of the remote unit 14. For example, the displayed color(s) can indicate that the remote unit 14 is "on" or otherwise powered, or charging. The displayed color(s) can indicate the status of the wireless connection between the remote unit 14 and the control unit 16. They can be different color(s) or the same color(s). In some embodiments, the remote unit user interface 20 can be lit in the color(s) and blinking to indicate that the remote unit 14 is "on." In some embodiments, when the wireless (e.g., Bluetooth) connection with the control unit 16 is established, the remote unit user interface 20 can cease blinking and become solid or constant. Alternatively, the "on" indication can be constant, and blinking can indicate that the connection is established. In some embodiments, the displayed color(s) of the remote unit user interface 20 can the indicate remote unit 14 status (e.g., on and/or connected) is blue.

In some embodiments, the remote unit 14 can be placed into a "standby" or low power state in which it scans, periodically or continually, for a signal from the control unit 16. In some embodiments, if the remote unit 14 receives a signal from the control unit 16, such as when the remote unit 14 and control unit 16 are within range of each other, the remote unit 14 "wakes" up or powers "on." The remote unit 14 can then connect with control unit 16 for communication therewith. The remote unit 14 and/or the control unit 16 can use, for example, Bluetooth Low Energy or BLE protocol to help extend battery life.

In some embodiments, the remote unit user interface 20 can be integral with or operatively connected to a switch for controlling the power state of the remote unit 14. The switch can be of any type that is currently is known or later becomes known. In one embodiment, for example, the switch is located in the general center of the remote unit 14 and the remote unit user interface 20 partially or fully surrounds the switch.

In some embodiments, the remote unit user interface 20 can also display one or more colors to indicate the temperature-related condition of the food item 12. In some embodiments, the color or colors is different from the color or colors used to indicate remote unit 14 status. In some embodiments, the remote unit user interface 20 displays a first color to indicate a status of the remote unit 14, and at least one second color indicating a temperature of the food item 12. In some embodiments, the at least one second color comprises a plurality of colors, each indicating a temperature-related condition of the food item 12.

In some embodiments, the color or colors indicating the temperature-related condition of the food item 12 indicate a relative status of the current temperature-related condition of the food item 12 and a set temperature-related condition or desired temperature-related condition of the food item 12. For example, if a food item 12 is being heated (e.g., cooked), the desired temperature-related condition of the food item 12 can be programmed into the remote unit 14. This can be done, for example, by entering a set or desired cooking parameter into the control unit 16, which then transmits information relating to that cooking parameter to the remote unit 14. In some embodiments, the cooking parameter is a temperature. In some embodiments, the cooking parameter is some other characteristic of the food item 12 (e.g., a doneness or degree of cooking, (e.g., medium rare)). In such embodiments, for example, the programming in the control unit 16 determines, based on various known or input characteristics of the food item 12 (e.g., type of food, cut, thickness, etc.), the desired temperature-related condition of the food item 12, and transmits that determined temperature to the remote unit 14. U.S. patent application Ser. No. 12/790,764, filed May 28, 2010, and 61/213,306, filed May 28, 2009, now U.S. Pat. No. 8,931,400, describe various embodiments and uses of cooking parameters.

In some embodiments, once the remote unit 14 receives or otherwise contains the desired temperature-related condition, the program of the remote unit 14 then compares the presently measured temperature-related condition received from the remote unit temperature sensor 18 to the desired temperature-related condition, and causes the remote unit user interface 20 to display a color indicating the temperature-related condition of the food item 12. For example, the remote unit user interface 20 can display a predetermined color and/or blink when the measured temperature-related condition reaches (or is within a programmed tolerance of) the set or desired temperature-related condition.

As one example, the remote unit user interface 20 can display a green color and/or blink when the measured temperature-related condition reaches the set or desired temperature-related condition. In embodiments in which the remote unit user interface 20 displays the status of the remote unit 14, as discussed above, the color of the remote unit user interface 20 can change from the status color or colors to the temperature-indicating color or colors upon the remote unit 14 receiving signals from the remote unit temperature sensor 18, or when some threshold temperature-related condition is reached.

In some embodiments, the remote unit 14 can display on the remote unit user interface 20 a plurality of colors to indicate a temperature-related condition. In some embodiments, the remote unit user interface 20 displays a succession of colors as the food item 12 approaches the set or desired temperature-related condition, each color indicating the relative nature of the sensed temperature-related condition to the desired temperature-related condition. For example, one color can indicate that the sensed temperature-related condition is a certain distance from the set or desired temperature-related condition, and another color can indicate that the sensed temperature-related condition is a certain distance from the set or desired temperature-related condition.

In some embodiments, a first color can indicate that the sensed temperature-related condition is greater than 15 degrees below the desired temperature-related condition, a second color that the sensed temperature-related condition is between 5 and 15 degrees below the desired temperature-related condition, a third color that the sensed temperature is less than 5 degrees below the desired temperature-related condition, and a fourth color that the sensed temperature-related condition is at the desired temperature-related condition. In some embodiments, the first, second, third, and fourth colors are green, yellow, orange, and red, respectively. As discussed above, in certain embodiments, when the sensed temperature-related condition, is at the set or desired temperature-related condition, the remote unit user interface 20 can also blink.

It should be understood by those of ordinary skill in the art that, although the above example uses four colors, any colors and fewer or more than four colors can be utilized. In addition, it should be understood by those of ordinary skill in the art that though the above example uses certain ranges and distances from the set temperature-related condition, any ranges or distances can be utilized. Those ranges/distances and/or colors can be predetermined in the programming of the remote unit 14, or can be transmitted to the remote unit 14 from the control unit 16. In some embodiments, the ranges/distances and/or color(s) can be pre-set in the programming of the control unit 16 (which can contain multiple different of such pre-sets). In other embodiments, the ranges/distances and/or color(s) can be input into the control unit 16 by a user.

As noted herein and in U.S. patent application Ser. No. 12/790,764, now U.S. Pat. No. 8,931,400, the remote unit 14, in some embodiments, can transmit the sensed temperature-related condition to the control unit 16, which can display the temperature-related condition to the user. However, the remote unit user interface 20 indicates to a user the temperature-related condition visually through visual signals, such as color. In such manner, a user can be informed of the temperature-related condition if the user is not near the control unit 16. Accordingly, a user can input the set temperature-related condition into the control unit 16, and then utilize the remote unit 14 to determine the temperature-related condition. This can be advantageous if the remote unit 14 is located, for example, near the food item 12, in a location that could be harmful or damaging to the control unit 16. For example, if the control unit 16 is a mobile phone and the remote unit 14 is located outside and it is raining, the user can monitor the food item 12 without exposing the control unit 16 to the elements. As another example, if the control unit 16 cannot be easily moved or carried to the location of the food item 12 (e.g., a desktop computer), the user can monitor the food item 12 away from the control unit 16.

In some embodiments, the remote unit user interface 20 can indicate whether the food item 12 is at (or within a pre-determined tolerance of) a set or desired temperature-related condition, above that temperature-related condition, or below that temperature-related condition. For example, the remote unit user interface 20 can display a first color if the sensed temperature-related condition is at (or within tolerance of) the desired temperature-related condition, a second color if the sensed temperature-related condition is below (e.g., outside the set tolerance of) the desired temperature-related condition, and a third color if the sensed temperature-related condition is above (e.g., outside the set tolerance of) the desired temperature-related condition. As one example, the remote unit user interface 20 can display green if at the desired temperature-related condition or within the set tolerance of the desired temperature-related condition, blue if it is below the desired temperature-related condition (e.g. outside the tolerance), and red if it is above the desired temperature-related condition (e.g. outside the tolerance). It should be understood by those of ordinary skill in the art that these colors are merely exemplary, and any colors can be utilized.

The set temperature-related condition and/or the tolerance can be present in the programming of the remote unit 12, depending upon the desired application. Alternatively, the set temperature-related condition and/or the tolerance can be transmitted from the control unit 16 to the remote unit 14. In some such embodiments, the set temperature-related condition and/or the tolerance can be pre-set or one of multiple pre-sets in the programming of the control unit 16. In other embodiments that set temperature-related condition and/or the tolerance can be input by a user.

The above-described embodiments can be useful in applications where it is desired or necessary for the food item 12 be maintained at or near a particular temperature-related condition. Accordingly, a user can, by viewing the remote unit user interface 20, determine whether the food item 12 is at an acceptable temperature-related condition. Moreover, the user can determine whether the food item 12 is hotter or colder than the desired temperature-related condition. The user can then, in suitable applications, take further action based on the indication.

As noted, above, the remote unit 14 can, in certain embodiments, transmit the sensed temperature-related condition to the control unit 16. In addition to the control unit 16 in some embodiments displaying the temperature-related condition, the control unit 16 can in further embodiments transmit the temperature-related condition to a remote location, either wirelessly (e.g., Wi-Fi, Bluetooth. cellular, etc.) or through a wired connection (e.g., Ethernet, landline, etc.). Thus, remote storage or data-logging (e.g., the cloud) of the sensed temperature-related condition over time can be performed. Remote monitoring of the temperature-related condition can also be performed, such as for example, in a central monitoring location that monitors temperature-related conditions at multiple remote locations.

In yet additional embodiments, the control unit 16 is programmed to take certain actions based on the sensed temperature-related condition. For example, in applications where it is desired or necessary for the food item 12 to be maintained at (or within a tolerance of) a desired temperature-related condition, the control unit 16 can be operatively connected to a thermostat or other temperature control mechanism. Accordingly, if the sensed temperature-related condition deviates from the set temperature-related condition or tolerance, and/or does so for a predetermined period of time, the control unit 16 can be utilized to adjust the thermostat or other temperature control mechanism so as to bring the food item 12 to the desired temperature-related condition or tolerance range. In such manner, the remote unit 14 in combination with the control unit 16 can automatically adjust the temperature-related condition of a food or other system without user action.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed:

1. A system for monitoring a temperature-related condition of an object, the system comprising:
    a remote unit including a remote unit body and a remote unit base, the remote unit base configured to removably engage the remote unit body, the remote unit base a magnetic portion configured to permit removable connection of the remote unit base to a cooking device;
    a computing device positioned within the remote unit body, the computing device including a processor and a non-transitory memory storage device, the computing device configured to determine, based on temperature data measured by a temperature sensor, (i) a current temperature-related condition of the object, and (ii) a relation of the current temperature-related condition of the object to a pre-set or desired temperature-related condition of the object; and
    wherein the remote unit further includes a user interface positioned on a top surface of the remote unit body and configured to display a plurality of colored lights, and wherein each of the plurality of colored lights corresponds to a different relation of the current temperature-related condition of the object to the pre-set or desired temperature-related condition of the object.

2. The system as defined in claim 1, further comprising a control unit located remotely from the remote unit, the control unit configured to deliver instructions to the remote unit, to the computing device, or to the user interface, the instructions indicating which of the plurality of colored lights are to be displayed corresponding to the relation of the current temperature-related condition to the pre-set or desired temperature-related condition.

3. The system as defined in claim 1, wherein the object is a food item.

4. The system as defined in claim 1, wherein the user interface is configured to display respective ones of the plurality of colored lights using a multi-colored LED.

5. The system as defined in claim 1, wherein the user interface is configured to display respective ones of the plurality of colored lights in succession, and wherein each one of the successive colored lights is respectively displayed when the current temperature-related condition of the object is within a corresponding successive proximity to the pre-set or desired temperature-related condition.

6. The system as defined in claim 2, wherein the control unit includes a control unit user interface configured to display the current temperature-related condition, and wherein the control unit is operatively connected to a thermostat and is configured to adjust the thermostat to bring the object to the pre-set or desired temperature-related condition.

7. The system as defined in claim 2, wherein the control unit is configured to adjust a thermostat operatively connected to the control unit based on the current temperature-related condition, and wherein the thermostat is configured to control a temperature of the object.

8. The system as defined in claim 3, wherein the current temperature-related condition is one of (i) a temperature of the food item or (ii) a degree of cooking or cooling of the food item.

9. The system as defined in claim 4, wherein the multi-colored LED is configured to display a blinking light when the current temperature-related condition matches the pre-set or desired temperature-related condition.

10. A system for monitoring a temperature-related condition of an object, the system comprising:
  a temperature sensor configured to measure temperature data;
  a remote unit including a remote unit body and a remote unit base, the remote unit body operatively coupled to the temperature sensor, the remote unit base configured to removably engage the remote unit body, the remote unit base having a magnetic portion configured to permit removable connection of the remote unit base to a cooking device;
  a computing device positioned within the remote unit body, the computing device including a processor and a non-transitory memory storage device, the computing device configured to determine, based on the temperature data measured by the temperature sensor, (i) a current temperature-related condition of the object, and (ii) a relation of the current temperature-related condition of the object to a pre-set or desired temperature-related condition of the object; and
  wherein the remote unit further includes a user interface positioned on a top surface of the remote unit body and configured to display a plurality of colored lights, wherein each of the plurality of colored lights corresponds to a different relation of the current temperature-related condition of the object to the pre-set or desired temperature-related condition of the object.

11. The system as defined in claim 10, further comprising a control unit located remotely from the remote unit, the control unit configured to deliver instructions to the remote unit, to the computing device, or to the user interface, the instructions indicating which of the plurality of colored lights are to be displayed corresponding to the relation of the current temperature-related condition to the pre-set or desired temperature-related condition.

12. The system as defined in claim 10, wherein the object is a food item.

13. The system as defined in claim 10, wherein the user interface is configured to display respective ones of the plurality of colored lights using a multi-colored LED.

14. The system as defined in claim 10, wherein the user interface is configured to display respective ones of the plurality of colored lights in succession, and wherein each one of the successive colored lights is respectively displayed when the current temperature-related condition of the object is within a corresponding successive proximity to the pre-set or desired temperature-related condition.

15. The system as defined in claim 11, wherein the control unit includes a control unit user interface configured to display the current temperature-related condition, and wherein the control unit is operatively connected to a thermostat and is configured to adjust the thermostat to bring the object to the pre-set or desired temperature-related condition.

16. The system as defined in claim 11, wherein the control unit is configured to adjust a thermostat operatively connected to the control unit based on the current temperature-related condition, and wherein the thermostat is configured to control a temperature of the object.

17. The system as defined in claim 12, wherein the current temperature-related condition is one of (i) a temperature of the food item or (ii) a degree of cooking or cooling of the food item.

18. The system as defined in claim 13, wherein the multi-colored LED is configured to display a blinking light when the current temperature-related condition matches the pre-set or desired temperature-related condition.

* * * * *